United States Patent Office 3,373,166
Patented Mar. 12, 1968

3,373,166
NOVEL 17-[(METHYLTHIO)METHOXY] YOHIMBANES
Jay Donald Albright and Leon Goldman, Nanuet, N.Y., assignors to American Cyanamid Company, Stamford, Conn., a corporation of Maine
No Drawing. Continuation-in-part of application Ser. No. 556,584, June 10, 1966. This application July 7, 1967, Ser. No. 651,673
10 Claims. (Cl. 260—287)

ABSTRACT OF THE DISCLOSURE

This disclosure describes compounds of the class of ring-E substituted 17-[(methylthio)methoxy]yohimbanes useful as central nervous system depressants.

CROSS REFERENCE TO RELATED APPLICATION

This application is a continuation-in-part of our co-pending application Ser. No. 556,584, filed June 10, 1966, now abandoned.

BRIEF SUMMARY OF THE INVENTION

This invention relates to new organic compounds and, more particularly, is concerned with novel 17-[(methylthio)methoxy]yohimbanes which may be represented by the following general formula:

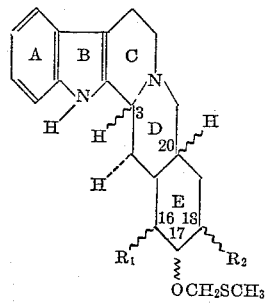

wherein $R_1$ is hydrogen or lower carboalkoxy and $R_2$ is hydrogen or lower carboalkoxy, with the proviso that $R_1$ and $R_2$ cannot be the same. Suitable lower carboalkoxy groups contemplated by the present invention are those having from 2 to 6 carbon atoms.

DETAILED DESCRIPTION OF THE INVENTION

The novel compounds of the present invention are, in general, white to tan crystalline solids, the free bases of which are soluble in organic solvents such as lower alkanols, chloroform, N,N-dimethylformamide, dioxane, pyridine, and the like; and the salts of which are soluble in polar solvents such as water and lower akanols.

The novel compounds of the present invention may be readily prepared by reacting an appropriately substituted 17-hydroxy yohimbe alkaloid of the following general formula:

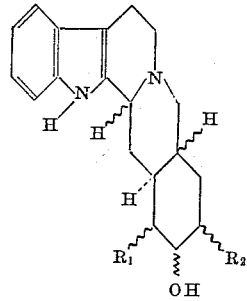

wherein $R_1$ and $R_2$ are as hereinabove defined, with di-methyl sulfoxide and a carboxylic acid anhydride. These starting materials for the preparation of the novel compounds of the present invention are derivatives of yohimbane belonging to the normal, pseudo, allo and epiallo series depending upon the cis or trans fusion of the D and E rings and the configuration at the 3-position. The preparation of these appropriately substituted 17 - hydroxy yohimbe alkaloid starting materials may be found in the following references: Hesse, "Indolalkaloide in Tabellen," 76–78, Springer—Verlag, Berlin (1964); Godtfredsen et al., Acta. Chem. Scand, 11, 1013 (1957); Janot et al., Bull. Soc. Chim. France, 637 (1961); Albright et al., J. Org. Chem., 28, 38 (1963). Typical 17-hydroxy yohimbe alkaloid starting materials which may be employed to prepare the novel 17-[(methylthio)methoxy] yohimbanes of the present invention are, for example, yohimbine, β-yohimbine, α-yohimbine, methyl 3-epi-17β-hydroxyyohimban-16α-carboxylate, methyl 3-epi-17α-hydroxyyohimban-16α-carboxylate, methyl 3-epi-17α-hydroxyyohimban-16β-carboxylate, methyl 3-epi-17α-hydroxyalloyohimban-16β-carboxylate, methyl 17β-hydroxyalloyohimban-16β-carboxylate, methyl 17α-hydroxyyohimban-18α-carboxylate and methyl 17β-hydroxyyohimban-18α-carboxyalte.

We have found that when yohimbe alkaloids containing a 17-hydroxy group are allowed to react with dimethyl sulfoxide and a carboxylic acid anhydride, in competition with oxidation of the 17-hydroxy function to a ketone, the novel products of the present invention containing a 17-(methylthio)methoxy group are formed. The reaction is carried out by contacting the 17-hydroxy yohimbe alkaloid with dimethyl sulfoxide and a 1–20 mole excess of a carboxylic acid anhydride such as acetic anhydride, benzoic anhydride, propionic anhydride, and the like, at 0° C. to 60° C. Preferably, the reaction mixture is allowed to stand at 20° C. to 30° C., protected from moisture, for sufficient time to insure completion of the reaction. The reaction time is not critical, however a period of 6 to 60 hours is generally satisfactory. If desired, an inert solvent such as benzene, toluene, chloroform, dichloromethane, N,N-dimethylformamide, acetic acid, dioxane or tetrahydrofuran may be employed as diluent. The product may be recovered by pouring the reaction mixture onto ice and, after standing, then made basic in the cold with a base such as ammonium hydroxide or aqueous sodium hydroxide. The mixture is then extracted with a suitable water immiscible organic solvent such as chloroform, dichloromethane, and the like. Concentration of the organic extracts then gives the crude product which is purified by crystallization or chromatography to give the 17-(methylthio)methoxy derivative.

The novel compounds of the present invention are valuable central nervous system depressants of low toxicity and were shown to possess CNS depressant activity as determined by animal experiments as follows. The compounds studied were administered intraperitoneally in a 2% starch vehicle to groups of six mice at three or more graded dose levels. At 15-minute and 30-minute intervals after treatment, each animal was placed on the midpoint of a horizontal steel rod (1.55 cm. in diameter and about 6 dm. in length), positioned 45.7 cm. above the surface of the table, and forced to walk toward a platform at either end of the rod. The criterion of inability to perform this act was consistent slipping to the side or falling off the rod. Effective doses for reduced rod-walking ability ($RWD_{50}$) were calculated or approximated from the data, and the time of peak effect was estimated from the data. One-half of the $RWD_{50}$ dose was given intraperitoneally to each mouse in groups of five. At the time of peak effect, as determined above, each group of mice was put into the actophotometer for a period of five minutes and the motor activity counts were recorded and compared to controls. Those compounds that appeared to reduce motor activity by 50% were administered to additional groups of five mice at graded doses and tested similarly. The dose ($MDD_{50}$) that caused a 50% reduction in motor activity was estimated. In a representative operation, and merely by way of illustration, methyl 17β-[(methylthio)methoxy]yohimban-16α-carboxylate was shown to induce ataxia ($RWD_{50}$) at a dose of 98 mg./kg. of body weight and to reduce locomotor activity ($MDD_{50}$) at a dose of 17 mg./kg. of body weight.

The novel compounds of the present invention are also valuable anti-inflammatory agents and were shown to possess anti-inflammatory activity as determined by animal experiments as follows. In a representative operation, suppression of carrageenin-induced foot edema and U.V.-induced ear erythema was obtained in rats when methyl 17α-[methylthio)methoxy]yohimban - 16α - carboxylate was administered orally at a dosage of 100 and 350 mg./kg. of body weight, respectively. Also, and merely by way of further illustration, temperature suppression of anti-yeast-induced pyresis was obtained in rats when methyl 17α-[(methylthio)methoxyyohimban-16α-carboxylate was administered orally at a dosage of 7.4 mg./kg. of body weight.

The present invention also embraces the useful non-toxic pharmaceutically acceptable acid-addition salts of these novel compounds. Typical acid-addition salts are the hydrochlorides, hydrobromides, sulfates, citrates, tartrates, succinates, and the like. Although the novel compounds of the present invention may be used as such, they are more preferably administered in the form of their non-toxic acid-addition salts which may be readily prepared by treatment with one or two equivalents of an acid such as hydrochloric, sulfuric, phosphoric, citric, etc., in a suitable solvent.

The invention will be described in greater detail in conjunction with the following specific examples.

Example 1

PREPARATION OF METHYL 17α-[(METHYLTHIO)-METHOXY]YOHIMBAN-16α-CARBOXYLATE

To a mixture of 886 g. of yohimbine and 7.55 l. of dry dimethyl sulfoxide is added 5.05 l. of acetic anhydride. The mixture is stirred at room temperature for 18 hours. The mixture is diluted with 16.8 l. of ethanol, stirred for one hour and diluted with 4.2 l. of water. Concentrated ammonium hydroxide (11 l.) is added while maintaining the temperature at 15–30° C. by cooling and the mixture is then diluted with 16.8 l. of water. Filtration gives a solid which is washed with water and dried. The solid is slurried with 4 l. of ethanol and filtered and the filtrate is concentrated under reduced pressure to give a dark colored gum. The gum is dissolved in chloroform:acetone:ethanol (6:3:1) and filtered through synthetic magnesia silica gel. The filter cake is washed with acetone and the filtrate is concentrated under reduced pressure to give 40 g. of dark gum. The gum (20 g.) is chromatographed on a column of 300 g. of silica gel using chloroform:ethanol (99.3:0.7) as eluting solvent and 250 ml. cuts are collected. Evaporation of cuts 5–11 gives the product as a glass. The combined glass from two column purifications is crystallized from methanol to give 6.95 g. of methyl 17α - [(methylthio)methoxy]yohimban-16α-carboxylate as tan crystals, M.P. 195°–198° C. Recrystallization of 2.0 g. from 20 ml. of methanol gives 1.2 g. of off white crystals, M.P. 198°–200° C.

Other compounds which can be prepared according to the above-described procedure are, for example:

methyl 3-epi - 17β-[(methylthio)methoxy]yohimban-16α-carboxylate, and methyl 3-epi - 17α-[(methylthio)methoxy]yohimban-16α-carboxylate.

Example 2

PREPARATION OF METHYL 17β-[(METHYLTHIO)-METHOXY]YOHIMBAN-16α-CARBOXYLATE

A mixture of 18.0 g. of β-yohimbine, 150 ml. of dimethyl sulfoxide and 100 ml. of acetic anhydride is allowed to stand at room temperature for 18 hours. The mixture is poured onto 400 g. of ice, allowed to stand one-half hour, and the chilled mixture is made basic with concentrated ammonium hydroxide. After standing 1.5 hours the chilled mixture is filtered and the solid is washed with water to give 18.5 g. of the product. Chromatography of 9.0 g. of this product on 300 g. of silica gel with chloroform:ethanol (99.3:0.7) (200 ml. cuts) affords, after evaporation of the eluates, methyl 17β-[(methylthio)methoxy]yohimban - 16α - carboxylate in fractions 13–18. Crystallization from methanol gives 1.0 g. of product as off white crystals, M.P. 188–190° C.

Other compounds which can be prepared according to the above-described procedure are, for example:

methyl 17α - [(methylthio)methoxy]yohimban-18α-carboxylate, and methyl 17β - [(methylthio)methoxy]yohimban-18α-carboxylate.

Example 3

PREPARATION OF METHYL 17α-[(METHYLTHIO)METHOXY]ALLOYOHIMBAN-16β-CARBOXYLATE

A mixture of 2.12 g. of α-yohimbine, 25 ml. of dry dimethyl sulfoxide and 4.0 ml. of acetic anhydride is stirred at room temperature for 21 hours. The mixture is poured onto 60 g. of ice and 10 ml. of water and made basic with concentrated ammonium hydroxide. The solid which separates is removed by filtration and washed with water. After drying overnight the solid is extracted into ether and the solution filtered through 10 g. of synthetic magnesia silica gel. The filter cake is washed with ether and the combined filtrates are concentrated in vacuo to give 2.1 g. of a pale orange glass. Chromatography of 4.1 g. of this glass over 200 g. of silca gel with chloroform:ethanol (99.5:0.5) as eluting solvent (100 ml. cuts) affords, after evaporation, methyl 17α-[(methylthio)methoxy]alloyohimban-16β-carboxylate in fractions 9 and 10. Crystallization from methanol gives 0.48 g. of product as tan crystals, M.P.: sinters above 92° C. to a viscous mass which slowly changes to a liquid.

Other compounds which can be prepared according to the above-described procedure are, for example:

methyl 3-epi-17-α[(methylthio)methoxy]yohimban-16β-carboxylate, methyl 3-epi-17α-[(methylthio)methoxy]alloyohimban-16β-carboxylate, and methyl 17β-[(methylthio)methoxy]alloyohimban-16β-carboxylate.

What is claimed is:

1. A 17-[(methylthio)methoxy]yohimbane compound selected from the group consisting of those of the formula:

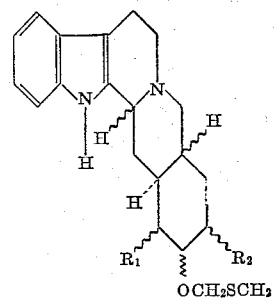

wherein $R_1$ is selected from the group consisting of hydrogen and lower carboalkoxy and $R_2$ is selected from the group consisting of hydrogen and lower carboalkoxy, with the proviso that $R_1$ and $R_2$ cannot be the same;

and the pharmaceutically acceptable acid-addition salts thereof.

2. A compound according to claim 1 of the normal yohimbane series wherein $R_1$ is $\alpha$-carbomethoxy and $R_2$ is hydrogen; said compound having the alpha configuration at the 17-position.

3. A compound according to claim 1 of the normal yohimbane series wherein $R_1$ is $\alpha$-carbomethoxy and $R_2$ is hydrogen; said compound having the beta configuration at the 17-position.

4. A compound according to claim 1 of the alloyohimbane series wherein $R_1$ is $\beta$-carbomethoxy and $R_2$ is hydrogen; said compound having the alpha configuration at the 17-position.

5. A compound according to claim 1 of the pseudo yohimbane series wherein $R_1$ is $\alpha$-carbomethoxy and $R_2$ is hydrogen; said compound having the beta configuration at the 17-position.

6. A compound according to claim 1 of the pseudo yohimbane series wherein $R_1$ is $\alpha$-carbomethoxy and $R_2$ is hydrogen; said compound having the alpha configuration at the 17-position.

7. A compound according to claim 1 of the epialloyohimbane series wherein $R_1$ is $\beta$-carbomethoxy and $R_2$ is hydrogen; said compound having the alpha configuration at the 17-position.

8. A compound according to claim 1 of the alloyohimbane series wherein $R_1$ is $\beta$-carbomethoxy and $R_2$ is hydrogen; said compound having the beta configuration at the 17-position.

9. A compound according to claim 1 of the normal yohimbane series wherein $R_1$ is hydrogen and $R_2$ is $\alpha$-carbomethoxy; said compound having the alpha configuration at the 17-position.

10. A compound according to claim 1 of the normal yohimbane series wherein $R_1$ is hydrogen and $R_2$ is $\alpha$-carbomethoxy; said compound having the beta configuration at the 17-position.

References Cited
UNITED STATES PATENTS 3,318,897   5/1967   Albright et al. _____ 260—287

JAMES A. PATTEN, *Primary Examiner.*